MICROWAVE IDENTIFICATION OF RAILROAD CARS

Original Filed Oct. 4, 1963 4 Sheets-Sheet 1

INVENTORS.
WILLIAM R. BRADFORD
STEVEN MOLNAR
BRUCE H. SIPERLY
BY Wallace, Kenyon & Hart
Attys

MICROWAVE IDENTIFICATION OF RAILROAD CARS

Original Filed Oct. 4, 1963 4 Sheets-Sheet 2

INVENTORS
WILLIAM R. BRADFORD
STEVEN MOLNAR
BRUCE H. SIPERLY
BY Wallace, Kenyon & Dorn
Attys

MICROWAVE IDENTIFICATION OF RAILROAD CARS

Original Filed Oct. 4, 1963 4 Sheets-Sheet 3

INVENTORS
WILLIAM R. BRADFORD
STEVEN MOLNAR
BRUCE H. SIPERLY
Wallace, Kinzer & Ford
Attys.

MICROWAVE IDENTIFICATION OF RAILROAD CARS

Original Filed Oct. 4, 1963 4 Sheets-Sheet 4

INVENTORS.
WILLIAM R. BRADFORD
STEVEN MOLNAR
BRUCE H. SIPERLY
BY Wallace, Kurger & Ford
Attys United States Patent Office Re. 26,292
Reissued Oct. 31, 1967

26,292
MICROWAVE IDENTIFICATION OF RAILROAD CARS

William R. Bradford and Steven Molnar, San Diego, and Bruce H. Siperly, Spring Valley, Calif., assignors, by mesne assignments, to Abex Corporation, a corporation of Delaware Original No. 3,247,508, dated Apr. 19, 1966, Ser. No. 313,886, Oct. 4, 1963. Application for reissue Aug. 8, 1966, Ser. No. 574,263
20 Claims. (Cl. 343—6.5)

Matter enclosed in heavy brackets [ ] appears in the original patent but forms no part of this reissue specification; matter printed in italics indicates the additions made by reissue.

*ABSTRACT OF THE DISCLOSURE*

*An automatic object identification system, shown as applied to the identification of railroad cars. The system includes a transmitter for radiating a microwave signal or other signal of given wavelength, with a given initial polarization, toward the objects to be identified, each of these objects carrying an identification member that is positioned to intercept and reflect the radiated signal, with a change in polarization, back to a receiver located adjacent the transmitter. A first zone plate lens is interposed in the original radiation path, this lens having a first series of arcuate bands with one transmission characteristic interspersed with a second series of arcuate bands of a different transmission characteristic. In one construction, the first series of bands are conductive and the second series dielectric; in another construction the lens is afforded by a grooved dielectric member. A similar zone plate lens is used in the reflection path to the receiver. A planar conductive septum or ground plane is interposed between the two lenses to reduce cross-talk between the transmitter and the receiver. Polarization grids are also interposed in the radiation and reflection paths to preclude cross-talk. These polarization grids may be simple linear conductive grids. The identification members include blank positions as well as reflector positions with a given number of end code positions on each identification member always including individual reflectors. A detector included in the receiver of the system develops a primary pulse signal that control a clock pulse generator for synchronized detection of the data from the identification member. A gate circuit, coupled both to the detector and to the clock pulse generator, is used to identify both the blank code positions and the reflector code positions on each identification member.*

This invention relates to a new and improved system for identifying railroad cars and locomotives and like vehicles, and more particularly to an improved automatic all-weather microwave car identification system utilizing novel microwave lens structures and novel coding arrangements.

It is critically important for railroad management to know, at all times, the locations of the locomotives and cars of a railroad system. If a car is loaded, identification of its location enables the railroad to keep the shipper and receiver posted as to progress of the car. If a car is empty, information as to its location is essential to enable use of the car when it is needed. Moreover, because both locomotives and cars require periodic service, continuing information regarding their location is important to proper servicing.

A number of different systems have been proposed to provide for automation of the reporting and recording of railroad car and locomotive location information. One particularly advantageous system is described in detail in the co-pending application of Omer F. Hamann and Sherman H. Boyd, Serial No. 160,004, filed December 18, 1961 (now abandoned and supplanted by application Serial No. 319,914, filed October 4, 1963, now Patent No. 3,247,509), in which each railroad car and locomotive is provided with a relatively small coded microwave reflector identification number. In that system, each coded identification member includes a plurality of individual reflector elements, which may be constructed to be resonant at a given microwave frequency. The system further includes a roadside scanning station comprising a source of microwave signals and a microwave transmitter antenna that is coupled to the signal source. The microwave signals are radiated from the transmitter antenna and are reflected back from each coded identification member traversing the scanning station to impinge upon a receiver antenna. The coded information represented by the reflected microwave signals is subsequently detected and processed to identify the individual railway vehicles passing through the scanning station.

Practical operation of a such a microwave scanning system, as applied to railroad vehicle identification, requires that the transmitting and receiving antennas be located only a short distance from the track along which the vehicles move during the identification process. The radiated microwave beam must be tightly focused on the path along which the identification members carried by the railway cars and other like vehicles move. On the other hand, it is essential that adequate distinction be maintained between the radiated signals and the reflected signals, since direct cross-talk between the transmitting and receiving antennas would make it extremely difficult if not impossible to distinguish the reflected code signals from the cross-talk and other background signals.

In the aforementioned Hamann and Boyd application elliptical reflector antenna structures are utilized for focusing of the microwave beam; with this construction, however, it is somewhat difficult to achieve adequate resolution of the focused beam, with the result that some difficulty is encountered in distinguishing the reflected code pulse signals from extraneous reflections and other background signals.

It is a principal object of the present invention, therefore, to provide a new and improved microwave lens system, for use in an automatic railway car identification apparatus, that affords relatively high resolution over short distances of the order of three or four feet. More specifically, it is an object of the present invention to provide a new and improved microwave lens system affording a beam width, at a focal distance of three or four feet, of the order of two centimeters or less.

Another object of the invention is to provide a high-resolution microwave lens system, suitable for short range use in an identification system for railway cars or like vehicles that is simple and inexpensive in construction and that requires a minimum of space at a trackside installation.

A particular object of the invention is to provide a new and improved microwave lens system for an automatic railway car identification apparatus that permits mounting of transmitting and receiving antenna structures immediately adjacent each other, yet eliminates cross-talk from the transmitting antenna to the receiving antenna.

Accordingly, the present invention relates to a lens system for use in an automatic vehicle identification apparatus of the kind including a source of microwave signals of given frequency, a transmitting antenna for radiating the microwave signal, an identification member mounted on a railway car or similar vehicle in position to intercept and reflect the radiated signal as the vehicle moves along a given path past the transmitting antenna, and a receiving antenna preferably located immediately adjacent the transmitting antenna. This lens system, in one embodiment of the invention, comprises a first microwave zone plate lens, sometimes referred to hereinafter as a Fresnel lens, constructed in the form of a plurality of bands each having a given microwave transmission characteristic and interspersed with bands having a substantially different microwave transmission characteristic at the frequency of the radiated signal. Typically, the first series of bands may be of a conductive signal-reflection material coated upon a dielectric base, with the second series of bands constituting uncoated surface portions of the same dielectric base. An alternate construction uses all dielectric material for the lens, with the interpersed bands being of differing thickness. This zone plate lens is interposed between the transmitting antenna and the path along which the identification member moves and is effective to focus the radiated microwave signal at a predetermined point on that path. A second microwave zone plate lens, substantially similar to the first lens, is incorporated in the lens system and is utilized to focus signals reflected from the identification member back to the receiving antenna. In the preferred construction described hereinafter, a planar conductive septum extends from the two lenses to a point intermediate the transmitting and receiving antennas and is used to preclude direct cross-talk between the antennas.

In the system described in the aforementioned application of Hamann and Boyd, each binary pulse, whether a one or a zero, is represented by a signal reflected from the identification member on the railway car. A system of this kind is advantageous in that it does not require synchronization of the de-coding system to the speed of the car. On the other hand, some difficulty may be encountered in distinguishing the reflected signals from the radiated signals and from each other.

It is a particular object of the present invention, therefore, to provide a new and improved identification member and de-coding circuit arrangement for a microwave identification system for railway cars and like vehicles that does not require reflection of a microwave signal for each binary value in the code.

It is a related object of the invention to provide a circuit that is effective to reconstruct a part of the reflected code data represented by the absence of reflected signal pulses, utilizing a synchronized system of pulse detection.

In a microwave railway car identification system or like system of the kind with which the present invention is concerned, a principal problem is the elimination of unwanted microwave signal reflections that do not represent the desired code data. As noted above, one advantageous means for increasing the signal-to-noise ratio of the system is to utilize an identification member that changes the polarization of the radiated signal before that signal is reflected back to the receiving antenna. In any such system, however, the required focusing lenses tend to introduce polarization components corresponding to those required at the receiving antenna. Consequently, it is highly desirable to afford a positive means for limiting the reflected signals impinging upon the receiving antenna to the desired polarization.

It is a principal object of the present invention, therefore, to afford a new and improved means for the positive elimination of unwanted polarization components in the reflected radiant signals focussed upon the receiving antenna of a microwave vehicle identification system.

A specific object of the invention is to provide polarization grid means, interposed between the path of movement of the identification members and the receiving antenna, to correct for polarization distortions introduced by the lens systems of a microwave vehicle identification apparatus.

An additional object of the invention is to afford a combined lens and polarization filter construction that is effective to focus the radiated microwave signal, in an automatic vehicle identification system, and is also effective to eliminate undesirable polarization components that would otherwise be introduced by the presence of the lens.

Thus, in another embodiment of the present invention, the lens system comprises a first microwave zone plate lens that is interposed between the microwave transmitting antenna and that path along which the identification member is moved. This lens is employed to focus the radiated microwave signal at a predetermined point on that path. A second microwave zone plate lens is interposed between the identification member path and the receiving antenna and is utilized to focus signals reflected from the identification members back to the receiving antenna. Between the identification member path and the receiving antenna, polarization grid means are interposed, and the polarization grid means are utilized to limit reflected signals focussed upon the receiving antenna to a given polarization. Preferably, similar polarization grid means are interposed between the first microwave zone plate lens and the identification member path to limit the radiated signal to a given initial polarization that is different from the limiting polarization of the grid means for the receiving antenna.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 illustrates an automatic railway car identifying apparatus 11 constructed in accordance with the system disclosed in the above-identified application of Omer F.

Figure 1:
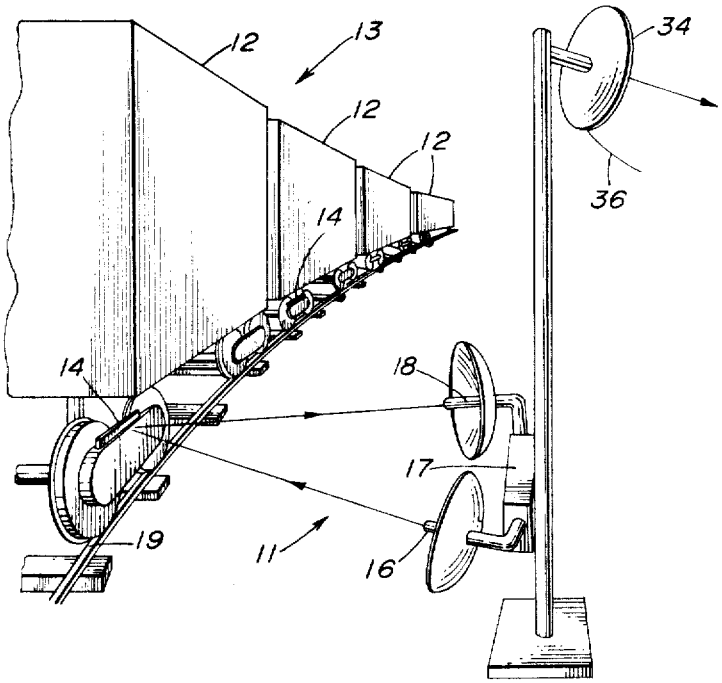
FIG. 1 is a partially schematic perspective view of a trackside scanning station for an automatic vehicle identification apparatus of the general type in which the lens system of the present invention is employed.

Hamann and Sherman H. Boyd and generally illustrative of the kind of automatic identification apparatus in which the present invention may be employed. The apparatus 11 constitutes a trackside scanning station and may be a part of a system including two or more essentially similar stations. The identification apparatus 11 includes transmitting antenna 16 and a receiving antenna 18 both connected to a circuit unit 17. The circuit unit 17 may be coupled to a centralized data processing station (not shown) by suitable means such as a transmission link comprising an antenna 34 or by a conductive line 36.

A train 13 moving past the identification apparatus 11 at the scanning station moves each individual car 12 along a given path, determined by the track 19, past the antennas 16 and 18. Each car 12 carries a plate-like identification member 14. Each identification member 14 is provided with a plurality of individual code reflector elements that are arranged in accordance with a predetermined code pattern as described more fully hereinafter. The identification members are mounted on the respective railroad cars 12 or like vehicles at a suitable location coinciding with the common focus of the two antennas 16 and 18. One suitable location for the identification plates 14, on the railway cars 12, is on the wheel carriages or trucks immediately above the springs, this location being substantially standardized with respect to height above the railway track 19.

On those relatively few cars where the illustrated truck mounting location for the identification members 14 cannot be used, a different mounting arrangement may be employed, so long as the identification plates traverse the required path coincident with the common focus of the antennas 16 and 18. The location of the identification members 14 lengthwise of the cars 12 is not critical; either truck on any given car may be selected for mounting the identification member, or the plates may be mounted at the mid-points of the cars. Preferably, there are two plates 14 for each car, one identification plate on each side of the car, so that it is not necessary to duplicate the identification apparatus 11 on the opposite side of the track 19.

In operation, a microwave signal from the circuit unit 17 is supplied to the transmitting antenna 16 and is radiated toward the path traversed by the identification members 14. In the preferred systems described in detail hereinafter, the polarization of the radiated signal is controlled so that virtually all of the radiation is limited to a given initial polarization. The radiated signal is intercepted and reflected, by the individual code reflector elements of each identification member 14, back to the receiving antenna 18. The target is a resonant structure oriented with reception axis inclined approximately at 45° to the plane of polarization for the transmitted beam. The receiving antenna 18 orientation is cross-polarized (90°) to the transmitting antenna 16. In this manner the receiving antenna system is insensitive to all reflections except those emanating from the resonant targets.

Reflected signals impinging upon the antenna 18 are detected to product a pulse signal representative of the position code of the individual reflector elements along the length of the identification member 14. This pulse signal is supplied, from the circuit unit 17, to suitable storage and data processing apparatus to identify each of the railroad cars 12 moving through the scanning station at which the apparatus 11 is located.

Figure 2:
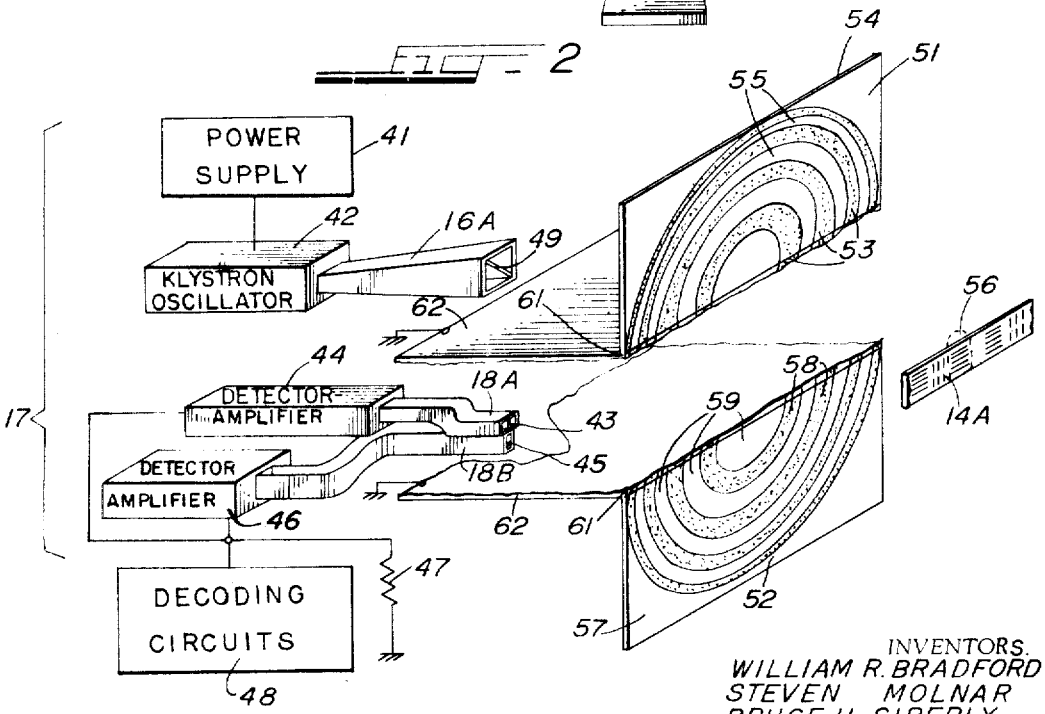
FIG. 2 is a partially schematic, partially exploded perspective view of a lens system constructed in accordance with one embodiment of the present invention.

FIG. 2 illustrates a lens system constructed in accordance with one embodiment of the present invention and adapted for incorporation in the automatic vehicle identification apparatus 11 of FIG. 1. In this embodiment of the invention, the circuit 17 includes a conventional power supply 41 that is connected to a klytron oscillator 42. The output from the klytron oscillator 42 is coupled to a wave guide 16A comprising the transmitting antenna of the system. The microwave signal developed by oscillator 42 is radiated from the wave guide 16A toward the identification member 14A and is reflected from the identification member back to a dual receiving antenna comprising the individual wave guides 18A and 18B. The wave guide 16A is preferably constructed, as by providing an internal septum 49, to limit radiation to vertically polarized and horizontally polarized signals, eliminating signals at other polarizations.

The first section of the receiving antenna, the wave guide 18A, is provided with an internal vertical septum 43 that effectively limits this antenna to the reception of horizontally polarized radiant signals. The wave guide 18A is connected to a detector amplifier circuit 44. The second receiving antenna wave guide 18B is provided with a horizontally disposed internal septum 45 to limit effective operation of this part of the receiving antenna to vertically polarized signals. Wave guide 18B is coupled to a second detector amplifier circuit 46.

The outputs of the two detector amplifier circuits 44 and 46 are connected to a resistor 47 that is returned to system ground, this resistor constituting a simplified illustration of an adding circuit for adding the output signals from the two detector circuits. The output from the adder circuit represented by the resistor 47 is applied to a decoding circuit unit 48 for interpreting the pulse signal outputs from the detector amplifiers to establish the identity of each railroad vehicle, as explained more fully hereinafter.

A first microwave zone plate lens 51 is interposed between the transmitting antenna 16A and the path along which the identification member 14A moves. A second similar microwave zone plate lens 52 is interposed between the identification member 14A and the receiving antenna 18A–18B. Lens 51 serves to focus the radiated signal from the transmitting wave guide antenna 16A upon a limited portion of the identification member 14A, illustrated by the dash outline 56. Lens 52, on the other hand, focusses signals reflected from identification member 14A back upon the receiving antennas 18A and 18B.

The zone plate lens 51, which may also be characterized as a Fresnel lens, comprises a first series of bands 53 each having a given microwave transmission characteristic. In this instance, the bands 53 are of conductive material and thus constitute microwave reflectors. The conductive bands 53 may be formed by coating suitable conductive material upon a base plate 54 of dielectric material. The deposition of the conductive coatings may be effected by familiar techniques employed in the fabrication of printed circuits, such as silk screening, selective etching, stenciling, or like techniques.

The conductive bands 53 are of semi-circular configuration and are interspersed with a second series of bands 55. This second series of bands 55 must have a substantially different microwave transmission characteristic than the first series of bands 53. In this instance the second series of bands comprises uncoated surface areas on the dielectric sheet 54. Conjointly, the conductive and non-conductive bands 53 and 55 afford a zone plate lens that focusses the microwave energy radiated by the transmitting antenna wave guide 16A upon a narrow segment of the identification member 14A, as generally indicated by the dash outline 56. It should be noted that the dash outline 56 is elongated in a vertical direction, as compared with its width in a horizontal direction, affording having some latitude for vertical displacement of the identification member 14A. This tolerance is highly desirable because it is virtually impossible to mount each of the identification members 14 at a consistent, uniform height above the track 19 (FIG. 1).

The second zone plate lens 52 is essentially similar in construction to the first lens 51. Thus, the second lens comprises a dielectric sheet 57 that is provided with a first series of semi-circular conductive bands 58 interspersed with a series of non-conductive bands 59. The second zone plate lens 52 is employed to focus signals reflected from the identification member 14 back to the receiving antennas 18A and 18B.

In the preferred construction illustrated in FIG. 2, the two zone plate lenses 51 and 52 are not physically separate from each other. Rather, these two lens structures are preferably formed on a single sheet of dielectric material and afford a continuous complete zone plate lens. That is, the dielectric sheet 57 is simply a continuation of the sheet 54 and the bands 58 and 59 constitute continuations of the bands 53 and 55 respectively.

The composite lens structure is, however, divided across its horizontal axis 61. A planar conductive septum 62 is disposed along the common axis 61 of the two lens sections 51 and 52. The septum 62, which may be formed by a thin sheet of conductive material such as a sheet of aluminum, extends back from the lens to a position intermediate the transmitting antenna wave guide 16A and the two receiving antenna wave guides 18A and 18B. Preferably, the septum 62 is grounded, thus affording a ground plane between the transmitting and the receiving antenna. This construction precludes direct transmission of the radiated signal from the transmitting wave guide 16A to the receiving wave guides 18A and 18B, which might otherwise obscure the code signals reflected from the identification member 14A.

Figure 8:
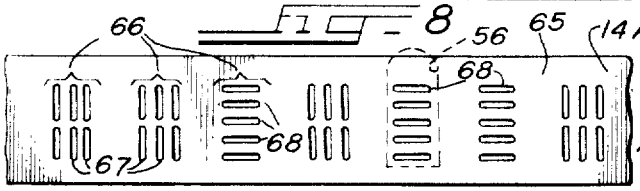
FIG. 8 illustrates another construction for the identification member, specifically adapted for use with the lens system of FIG. 2.

One construction for the identification member 14A is shown in FIG. 8. The identification member 14A comprises a dielectric base 65. There are a series of code positions 66 equally spaced longitudinally of the identification member. At the first of these code positions at the left-hand side of the identification member, there are a series of individual conductive elements 67 arranged in vertical alignment on the base 65. Each of these reflector elements 67 is preferably constructed to one-half wave length in length at the operating frequency for the apparatus of FIG. 2, so that each constitutes a resonant reflector for the microwave signals.

A second form of conductive reflector element is shown at the third code position 66 on the identification member 14A of FIG. 8. Again, this code position is provided with a plurality of individual reflector elements 68 having a length equal to one-half wavelength at the operating frequency. In this instance, however, the conductors are disposed in a horizontal alignment on the dielectric sheet that comprises the base of the identification member. In each instance, the individual reflector elements 67 and 68 are quite narrow in width, as compared to their length, the width preferably being restricted to one-quarter wavelength or less. It should be noted that it is not essential to use a plurality of reflectors at each code position; one will do. The plural construction is employed only for added signal strength and to extend the effective height of the reflectors in the code positions.

The reflector elements 67 and 68 of the identification member 14A afford a convenient means for distinguishing between vertically polarized and horizontally polarized radiated signals. Thus, a vertically polarized signal impinging upon the resonant reflectors 67 excites those reflectors and produces a reflected signal that exhibits only a small loss in amplitude as compared with the original impinging signal. On the other hand, a horizontally polarized signal impinging upon the reflector elements 67 is reflected only at a very reduced amptitude, the actual loss usually being more than 30 db. Conversely, the horizontally aligned reflector elements 68 reflect the horizontally polarized impinging microwave signal with little loss in amplitude but provide very substantial attenuation with respect to any impinging vertically polarized signal.

If reflector elements such as the reflector elements 67 are arbitrarily assigned the binary value of one and the horizontal elements 68 are assigned the binary value of zero, it is seen that the identification member 14A presents a code identification constituting the binary numeral or designation of 1101001. It will be recognized that any desired information, including both alphabetic and numeric characters can be designated by a predetermined combination of the reflector elements 67 and 68 along the length of the identification member 14A.

When the apparatus illustrated in FIG. 2 is placed in operation, the power supply 41 continuously energizes the klystron oscillator 42. Oscillator 42 produces an output signal in the microwave frequency range, preferably in the range of five to forty kilomegacycles. This microwave signal is radiated by the antenna 16A with both vertical and horizontal polarizations. The radiated signal is focussed on the identification member 14A, as the identification member traverses the focus of the lens 51, and is reflected from the identification member back through the lens 52 to the receiving antennas 18A and 18B.

At any given instant, and as shown in FIGS. 2 and 8, only one of the complete sets of individual reflector elements of the identification member 14A can be located within the focus 56 of the transmitting lens 51. Consequently, only one of the polarization components of the radiated signal is reflected from the identification member without substantial loss of amplitude, the other reflection component, with a polarization displaced 90°, being substantially attenuated at the identification member. Accordingly, there is a substantial differential between the received signals at the two receiving antenna wave guides 18A and 18B.

In both FIGURES 2 and 8, the identification member 14A is shown with the radiation focus 56 coincident with one of the horizontal reflector elements sets 68. Under these circumstances, the horizontal component of the radiated signal is reflected back to the receiving antenna without substantial attenuation and produces an appreciable pulse signal through the receiving antenna wave guide 18A. But the reflection of the vertically polarized component of the signal is very weak and only a negligible signal is produced in the receiving antenna wave guide 18A. Consequently, a pulse signal of appreciable amplitude is produced in the adding circuit 47 and is supplied to the de-coding circuit 47, indicating the presence of a binary zero.

If one of the vertically aligned reflector sets 67 were disposed at the lens focus 56, the opposite result would be achieved. Thus, under these circumstances the horizontally polarized component of the radiated signal is greatly attenuated and the wave guide 18A receives only a weak impinging signal. But the vertical polarization component is reflected with little or no attenuation and produces a strong pulse signal through the wave guide 18B. Again, a pulse of usable amplitude is produced in the adding circuit 47, indicating the presence of a binary one.

The polarities of the outputs from the detector amplifiers 44 and 46 are reversed as applied to the resistor 47, so that the binary ones and binary zeros can be readily distinguished from each other. In the time intervals in which the beam spans parts of two adjacent reflectors of opposite polarization characteristics, this arrangement causes the fringe pulse signals to cancel each other in the adding circuit, aiding in distinguishing between code "ones" and "zeros." Moreover, the backing relation of the signals applied to the adder is of material assistance in cancelling out background noise signals.

Figure 3:
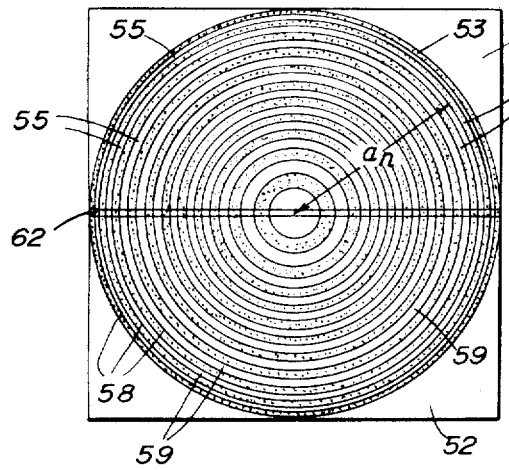
FIG. 3 is an elevation view of the zone plate lenses employed in the lens system of FIG. 2.
Figure 4:
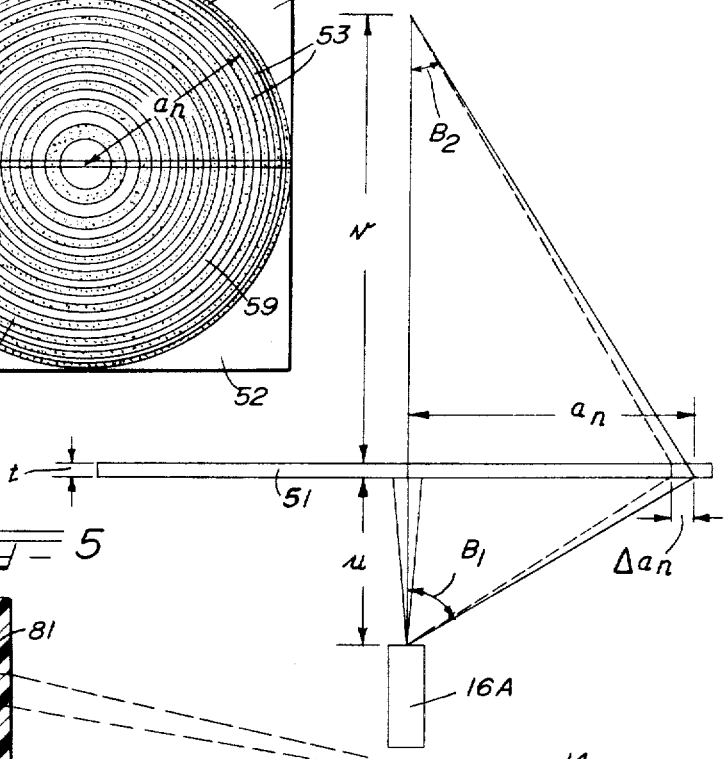
FIG. 4 is a simplified plan view illustrating the required relationship for the construction of the zone plate lenses in the lens system of FIG. 2.

FIGS. 3 and 4 illustrate the manner in which the boundaries of the conductive bands and the non-conductive bands of the microwave lenses 51 and 52 are determined. To determine the location of a given boundary it is necessary to take into the account the primary focal distance from the transmitter antenna wave guide 16a to the inner surface of the dielectric sheet 51 constituting the support element of the lens. It is also necessary to take into the account the distance from the lens to the focal point of the system on the path over which the identification members travel. A further factor that must be taken into account is the wave length of the microwave signal. Utilizing these known parameters, the location of a given boundary, taken as the nth boundary, for the microwave band, is determined approximately in accordance with the expression:

$$a_n^2=\frac{(u)(v)+\alpha_n}{\left(\frac{u+v}{2}\right)^2+\alpha_n}\cdot\alpha_n \tag{1}$$

in which $$\alpha_n\equiv(u+v)\frac{n\lambda}{4}+\left(\frac{n\lambda}{4}\right)^2 \tag{2}$$

In the foregoing expression, the following quantities are represented:

n=number of boundary outwardly of lens axis
u=distance from transmitter antenna to lens
v=distance from lens to identification member
λ=wavelength of microwave signal
$a_n$=spacing of nth boundary from lens axis There is no particular critical number of bands that must be used in the microwave lens, although it is desirable to employ a lens structure having at least ten to twenty bands to provide a good focussing action. A lens structure having approximately forty interspersed bands of conductive and non-conductive characteristics has been found to afford effective focussing for the microwave system.

The foregoing Equation 1 constitutes a useful approximation of the location of the boundaries for the bands but is based upon an assumption that the supporting dielectric sheet 51 is of negligible thickness. In actual practice, this is ordinarily not realizable unless the dielectric bands are air and the metal reflector bands are self supporting. This leaves the antenna exposed to the weather, a quite undesirable condition. Consequently, it is necessary to correct the foregoing expression for the finite thickness of the dielectric sheet 51.

A first order correction can be accomplished readily by moving each of the bands outwardly by an increment determinated in accordance with the following expression:

$$\Delta a_n=t\sqrt{k_\epsilon}\left(\frac{1-\sqrt{1-\frac{\sin^2 B_2}{k_\epsilon}}}{\sin B_1+\sin B_2}\right) \tag{3}$$

in which $\Delta a_n$=correction increment away from lens axis
t=thickness of lens dielectric
$k_\epsilon$=dielectric constant of lens support $$\sin B_1=\frac{a_n}{\sqrt{u^2+a_n^2}},\ \sin B_2=\frac{a_n}{\sqrt{v^2+a_n^2}}$$

With the foregoing correction, quite accurate focussing of the microwave beam at a predetermined point on the path of movement of the identification members can be achieved.

Figure 5:
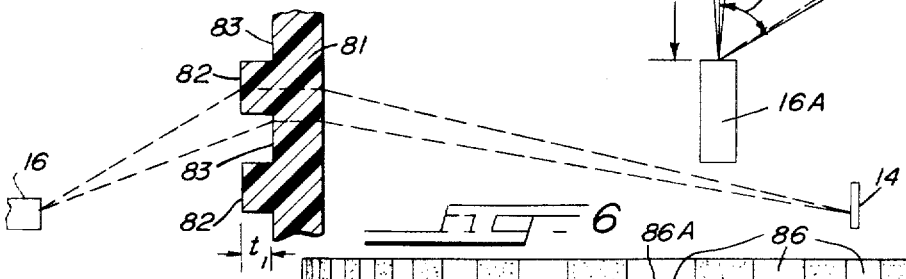
FIG. 5 is a schematic illustration of another construction that may be employed for the zone plate lenses in the lens system of FIG. 2.

Alternating conductive and non-conductive bands, as employed in the lenses 51 and 52 described hereinabove, present only one form of microwave zone plate lens that can be used in accordance with the present invention. A microwave lens having substantially similar characteristics can be constructed using a sheet of dielectric material having a predetermined dielectric constant at the operating frequency of the microwave system. As shown in FIG. 5, such a dielectric sheet 81 may be provided with a first series of bands 82 of predetermined thickness and a second series of bands 83 having a substantially different thickness. The boundaries for the bands 82 and 83 are determined in accordance with the Equations 1, 2 and 3 set forth hereinabove.

Determination of the requisite differential in thickness between the bands 82 and 83 is made in accordance with the following expression:

$$t_1=\frac{\lambda}{2(\sqrt{k_\epsilon}-1)} \tag{4}$$

in which $t_1$ is the differential thickness required. An all-dielectric lens of the kind generally illustrated in FIG. 5 can be prepared by precision machining of a dielectric sheet, by hot pressing of a suitable dielectric, or by other familiar manufacturing techniques.

Figure 6:
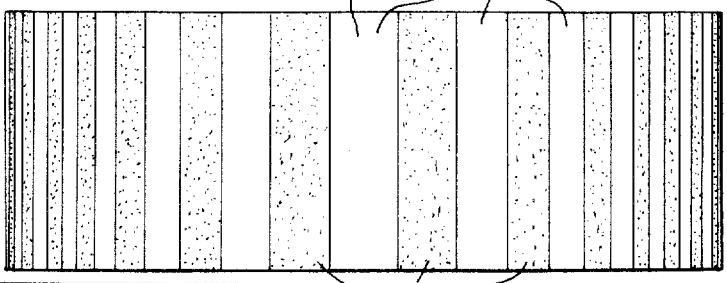
FIG. 6 is an elevation view of another form of zone plate lens structure that may be utilized in the lens plate system of FIG. 2.

Although the preferred lens configuration is the semicircular configuration employed for the Fresnel lenses 51 and 52 illustrated in FIGS. 1 through 4, an effective lens structure can be constructed with linear lens elements. Such a construction is illustrated in FIG. 6, in which a dielectric support sheet is provided with alternating bands 85 and 86 of conductive and non-conductive characteristics. In the construction shown in FIG. 6, the central band 86a is of light plastic material, uncoated with conductive material. Boundaries for the bands 85 and 86 are determined, starting at the center of the band 86A, in accordance with Equations 1, 2 and 3.

In a system in which it is necessary to provide for substantial vertical elongation of the focus of the lens, as where relatively large vertical excursions of the identification members are encountered, the lens structure shown in FIG. 6 may be quite desirable. Since overall height of the lens focus is an inverse function of the height of the lens, a relatively short lens of the kind shown in FIG. 6 affords vertically elongated focus quite suitable for an environment of this kind.

Of course, a linear-band zone plate lens similar to that shown in FIG. 6 can also be constructed with the varying-thickness dielectric arrangement shown in FIG. 5, following the requirements of Equation 4.

In any of the lens systems constructed in accordance with the invention, it is highly desirable that the two focal lengths u and x (FIG. 4) be substantially different. If the focal lengths are approximately equal, the signals impinging on the side of the lens facing the transmitting antenna 16A are reflected back to the transmitting antenna, with some time delay, tending to obscure the desired transmission signal. By the same token, signals reflected from an identification member at the distant focus of the lens are reflected back from the outer face of the lens to the same location, again creating confusing signal conditions. Preferably, the second focal length v should be at least twice as large as the initial focal length u, although any substantial differential between the two focal lengths affords an operable system.

Figure 9:
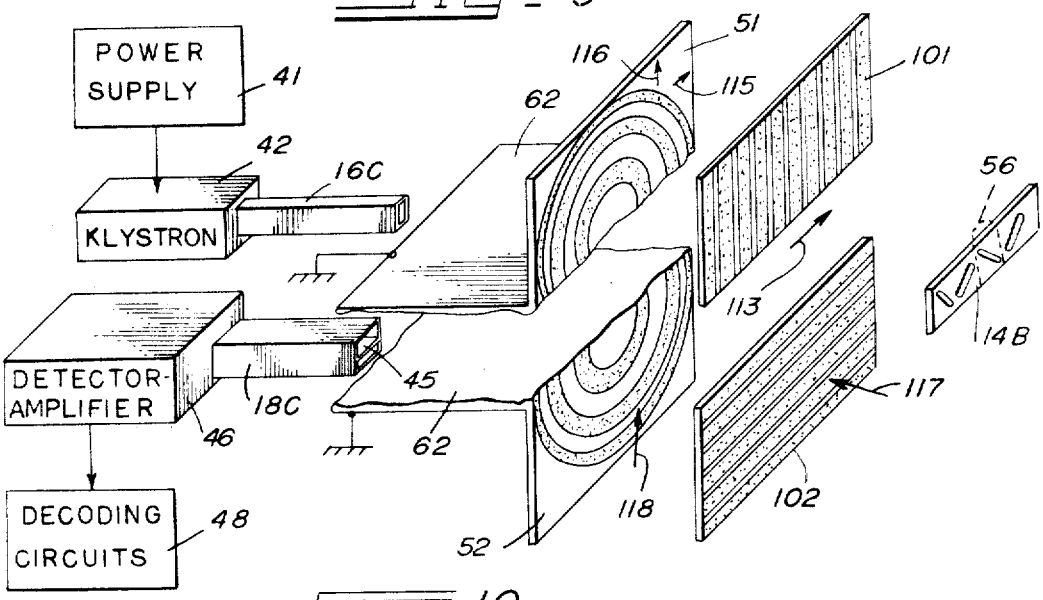
FIG. 9 is a partially schematic, partially exploded perspective view of a lens system constructed in accordance with another embodiment of the invention.

FIG. 9 illustrates a lens system constructed in accordance with a preferred embodiment of the invention. This lens system is utilized in conjunction with a transmitting apparatus that is essentially similar to that described above in connection with FIG. 2. Thus, the signal source for the system again comprises a klystron oscillator 42 energized from a suitable power supply 41. The klystron oscillator is connected to a transmitting wave guide 16C that, in this instance, is constructed to radiate a horizontally polarized microwave signal. As in the previous embodiment, the outlet of the radiating wave guide 16C is located immediately above a conductive septum 62 that extends from the wave guide to the Fresnel lens 51. The radiating source represented by the right-hand end of the wave guide 16C is located at one focus of the lens 51. The outer focus of the lens is coincident with a path along which the vehicle identification members, such as the member 14B, are moved.

The receiving portion of the lens system is substantially similar to the transmitting portion. As in the previous embodiment, a second zone plate lens 52 is provided for focussing the reflected signals from the identification member 14B back to the end of a receiving wave guide 18C, located immediately below the left-hand edge of the septum 62. Preferably, the wave guide 18C is provided with a horizontally extending internal septum 45 to reduce effective reception of horizontally polarized signals. The receiving wave guide 18C is connected to a suitable detector and amplifier circuit 46 in turn connected to decoding circuits 48.

A principal difference between the lens system of FIG. 9 and that of FIG. 2 is the incorporation of a first polarization grid 101 between the transmitting lens 51 and the identification member 14B being scanned. A similar polarization grid 102 is interposed between the identification member and the second or receiving antenna 18C. In the illustrated arrangement, the second polarization grid 102 is located between the identification member 14B and the lens 52.

The lens system illustrated in FIG. 9 is intended to be used with identification members having individual code reflector elements that change the polarization of the received signal to a substantial extent, in the course of reflection of that signal back to the receiving antenna. By way of example, the lens system of FIG. 9 in a phase sensitive system may utilize the identification member construction shown in FIG. 7, which is essentially similar to that disclosed and claimed in the above identified application of Hamann and Boyd.

Figure 7:
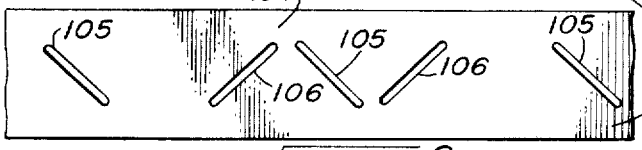
FIG. 7 illustrates one form of coded identification member with which lens systems constructed according to the invention may be employed.

The identification target member 14B illustrated in FIG. 7 comprises a conductive metal sheet 104. The conductive sheet 104 is provided with a first series of slots 105 disposed at an angle of 45° to the vertical, in a counterclockwise direction. The sheet 104 is also provided with a plurality of individual reflector slots 106 that are disposed at an angle of 45° to the vertical in a clockwise direction. The reflector slots 105 may arbitrarily be designated as representing a rotation of +45° to the vertical and as representing binary "ones." Correspondingly, the slots 106 are rotated through an angle of −45° to the vertical and may constitute binary "zeros."

Figure 10:
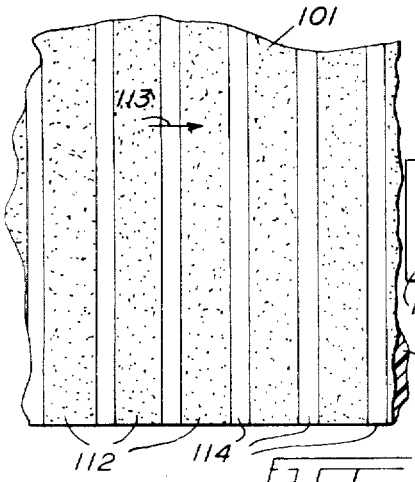
FIG. 10 is an enlarged detail elevation view of a grid structure constituting one component of the lens system of FIG. 9.

To reach a full understanding of the operation of the lens system of FIG. 9, it is necessary to consider the construction of the polarization grids 101 and 102. A small segment of the grid 101 is shown in enlarged detail in FIG. 10. The grid comprises a base sheet 111 of dielectric material having a series of metal bands 112 extending vertically across the face of the sheet. These elongated conductive elements 112 extend in a vertical direction. The grid is required to pass horizontally polarized signals, as indicated by the arrows 113 in FIGS. 9 and 10. Thus, the conductive elements 112 are disposed transversely of the lens 51 and parallel to the direction of polarization of signals that are to be rejected by the grid.

The absolute dimensions of the conductive elements 112 are not extremely critical. However, the width of each conductive element or band must be substantially smaller than one-half the wave length of the microwave frequency employed in the system. Moreover, it has been found that it is desirable to make the intervening clear strips between the conductive bands 112 somewhat narrower than the conductive elements themselves. In a typical construction, and in a system operating at approximately 36 kilomegacycles, the conductive elements 112 may have a width of approximately 0.03 inch, the intervening clear dielectric bands having a width of approximately 0.01 inch.

In operation, a microwave signal developed by the klystron oscillator 42 is radiated by the antenna wave guide 16C and is focussed upon the identification member 14B, by the lens 51, as described hereinabove. The signal as originally radiated from the antenna 16C is horizontally polarized. As the signal is transmitted through the lens 51, vertically polarized components are introduced, particularly along those parts of the lens extending at angles of 45° from the lens axis. These vertical polarization components are indicated in FIG. 9 by the arrow 116, as contrasted with the horizontally polarized components 115 constituting the desired signal.

The horizontally polarized components of the radiated signal are transmitted without substantial attenuation through the polarization grid 101 to afford the desired horizontally polarized signal 113 impinging upon the identification member 14B. To the vertically polarized components passed by the lens 51, and as indicated by the arrow 116, the grid 101 represents an effective short circuit. That is, to these signals the grid 101 appears as a wave guide operating beyond cutoff. This relationship is attained as long as the width of both the conductive bands 112 and the clear bands 114 is maintained substantially smaller than one-half the operating wave length of the system.

The microwave signal impinging upon the identification member 14B, as generally indicated by the focal outline 56 in FIG. 9, excites an individual dipole slot on the identification member whenever that slot is well located within the focus. As a result, the signal is reflected and re-radiated, but with a change in polarization through an angle of plus or minus 45°, depending upon the orientation of the dipole slot. Thus, the reflected signal impinging upon the second polarization grid 102 is oriented at an angle of 45°, as indicated by arrow 1117 and thus includes both vertical and horizontal polarization components.

The second polarization grid 102 is essentially identical in construction to the grid 101 except that it is oriented at an angle of 90° relative to the first grid. Thus, the polarization grid 102 passes vertically polarized signals without substantial attenuation. But horizontally polarized signals are effectively shorted out by the grid structure 102 and are not passed on to the lens 52. Accordingly, the signal reaching the second or receiving lens 52 is effectively limited to a vertically polarized signal as indicated by the arrow 118.

The received signal is focussed, by the lens 52, upon the receiving antenna wave guide 18C. In passing through the lens 52, a certain amount of distortion in the polarization of the signal can be expected. In the arrangement shown in FIG. 9, however, this is effectively eliminated by incorporation of the horizontally disposed septum 45 in the wave guide 18C, limiting reception at the wave guide to the desired vertically oriented signals.

In FIG. 9, the polarization grids 101 and 102 have been displaced from the lenses 51 and 52 for clarity of illustration. In actual practice, the polarization grids are mounted quite close to the lenses. Indeed, the preferred arrangement is to mount the polarization grids directly on the surface of the two Fresnel lenses. The same dielectric sheet that is employed as a part of each of the two lenses 51, 52 may also be utilized as the support member for the polarization grids 101, 102, since the raised or conductive bands affording the lens action are disposed on the surface of the lens dielectric facing the two antennas. This makes it possible to apply the conductive elements 112 affording the polarization grid on that surface of the same lens dielectric that faces the identification member 14B.

Figure 11:
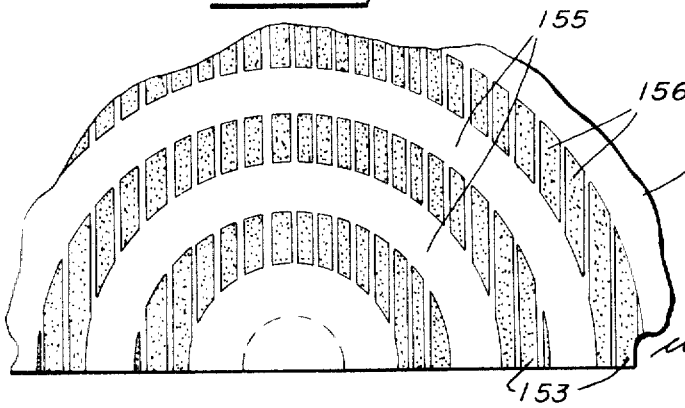
FIG. 11 is a detail elevation view of a combined lens and grid structure comprising a modification of the lens construction of FIG. 9.

FIG. 11 is a detail of another construction by which the polarization grid and the lenses may be combined. The combined lens and grid structure 151 shown therein is similar to the lens 51 in that it comprises a series of conductive bands 153 interspersed with non-conductive bands 155. In this instance, however, the conductive bands 153 are not continuous. Instead, each conductive band 153 is formed by a series of vertical conductor elements 156 that are separated from each other by very narrow vertically extending non-conductive surface areas 157. The widths of the elements or bands 156 and 157 are made substantially smaller than one-half the operating wavelength of the system. With this construction, the polarization filtering effect of the grid structure 101 is directly combined with the focussing effect of the lens 51 (FIG. 9) in a single structure. That is, the combined lens and grid construction shown in FIG. 11 focuses the microwave beam and at the same time inhibits the transmission of any but horizontally polarized signals. Of course, a similar construction can be adopted for combining lens 52 and grid 102.

In connection with any of the foregoing systems, it should be recognized that the initial polarization or polarizations for the radiated signals need not be horizontal or vertical. Any desired angle can be seleced, and the entire system can be oriented to accommodate the initial polarization selected. For example, in the system of FIG. 9, it would be equally practical to radiate a vertically polarized signal, at the outset, providing for reception of a horizontally polarized signal. The only change required in the lens system would be the interchange of grids 101 and 102. Of course, the transmitting and receiving antennas would have to be modified accordingly, although this is primarily a matter of orientation.

The system illustrated in FIG. 9 affords a substantial advantage, as compared with the system of FIG. 2, in distinguishing reflected pulse signals from extraneous reflections that do not represent coded information. Thus, the identification member 14B provides a substantial reflection of the original horizontally polarized signal 113. But this signal is not passed through the grid 102. On the other hand, the rotated signal reflected by the individual dipoles of the identification member is readily passed through the grip 102, providing a clear and usable distinction between the code signals and the stray reflections. Thus, the system of FIG. 9 is better protected against extraneous reflected signals than is a system which does not provide for a change in polarization of the reflected signals by the coded identification members.

Some difficulty may be encountered, however, with distinguishing between reflected signals that have been rotated 45° in one direction, with respect to polarization, and those that have been rotated by the same amount in the opposite direction, at the identification member. Thus, with the arrangement illustrated, a binary "one" may be represented by a horizontally polarized signal oriented at zero degrees, as received at the receiving antenna 18C, and a binary zero would then be represented by a horizontally polarized signal at 180°. This 180° differential in orientation of polarization can be detected and can be employed to distinguish the two different code values, but the detecting and discriminating circuits required may be relatively complex and may sometimes tend toward confused operation.

Figure 13:
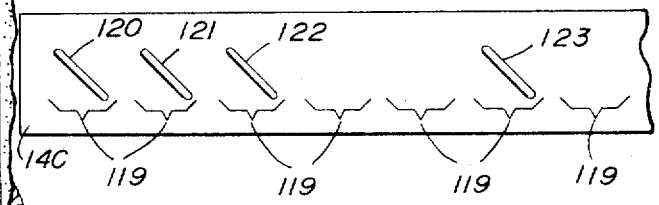
FIG. 13 illustrates an identification member for use with the circuit arrangement of FIG. 12.
Figure 12:
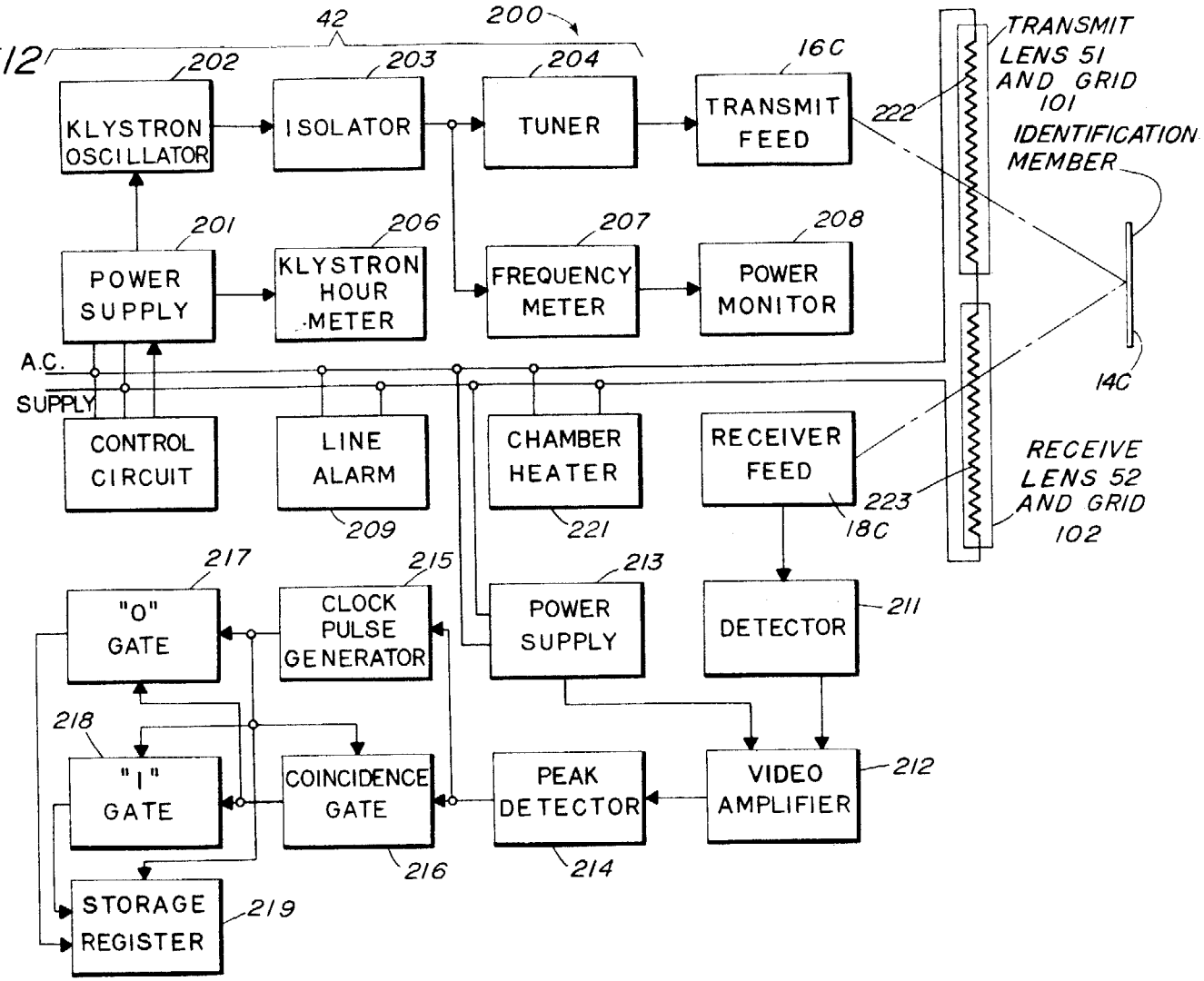
FIG. 12 is a block diagram of operating circuits for the lens system of FIG. 9, using a particular form of identification member.

A modification of the system described in connection with FIG. 9, which does not require any change in the lens system itself, is illustrated by FIGS. 12 and 13. This modification requires the use of a different identification member as shown, for example, by the identification member 14C in FIG. 13.

The identification member or target 14C illustrated in FIG. 13 constitutes an elongated strip of conductive metal with a series of arbitrarily designated equally spaced code positions 119 distributed along the length of the identification member. Only one end of the identification member is shown in FIG. 13; it should be understood that the identification member is considerably greater in length than the illustrated segment.

Starting from the left edge of the identification member 14C, three resonant dipole slots 120, 121 and 122 are provided at the first three code positions 119. Similarly, at least three additional such dipole reflector slots would be located at the opposite end of the identification members (not shown). The remaining code positions 119, however, may or may not be provided with dipole slots, depending upon the code values that they are to represent. Thus, for a given code representation, the first character may be represented by the four code positions 119 at the right-hand side of that segment of the identification member 14C illustrated in FIG. 13. If the code required for this character, in binary terms, is 0010, and if the presence of a reflector slot indicates a binary one, then the construction employed is as illustrated, with only one slot 123 in this sequence of code positions. The remaining three code positions are left blank, and represent binary zeros. Of course, a slot could represent a binary zero instead of a binary one, in which case the coding for the four code positions would be reversed and there would be three dipole reflector slots and only one blank code position.

Interpretation of the coded data from an identification member such as the member 14C requires synchronization of operation of the de-coding circuits with movements of the identification member through the scanning station. A synchronized system is illustrated in the block diagram of FIG. 12.

The scanning and de-coding system 200 of FIG. 12 comprises a power supply 201 connected to a suitable A.C. source. The power supply is connected to klystron 202, the complete oscillator circuit arrangement 42 including an isolator circuit 203 and a tuner 204. The tuner 204 is connected to a transmitter feed corresponding to the transmitting antenna 16C in the simplified system illustration of FIG. 9. The power supply 201 may also be connected to a conventional klystron hour meter 206. A conventional frequency meter 207 may be connected to the klystron oscillator, the specific connection illustrated being at the output of isolator circuit 203. Moreover, a power monitor 208 may be connected to the frequency meter 207 and a line alarm 209 may be provided for the A.C. supply to afford a conventional fault monitor arrangement for the system.

In the block diagram of FIG. 12, the receiver feed 18C is coupled to a first detector circuit 211 which, in turn, is coupled to a video amplifier 212. The video amplifier 212, and the other receiver circuits, may be actuated by a suitable second power supply 213. The signal output from the video amplifier 212 is applied to a peak detector 214 having an output circuit connected to a clock pulse generator 215.

The output of the peak detector 214 is also coupled to a coincidence gate 216 having a second input taken from the output of the clock pulse generator 215. The system further includes a "zero" gate 217 having two inputs, one taken from the clock pulse generator and the other taken from the output of the coincidence gate 216. A "one" gate 218 is provided; this gate has two inputs, one from the clock pulse generator and the other from the coincidence gate. The output from the two gates 217 and 218 are coupled to a storage register 219 that is also provided with an additional stepping input from the clock pulse generator 215.

In considering operation of the system conjointly represented by FIGURES 9, 12 and 13, it may first be assumed that the power supply 201 is energized, actuating the klystron oscillator circuit 42 comprising the individual circuit units 202, 203 and 204. This is effected before an identification member moves into the focal point of the transmitting and receiving lenses 51 and 52. Initially, and as long as there is no identification member present, virtually all of the horizontally polarized signal radiated by the transmitter bead 16C is rejected by the grid 102 associated with the receiving lens 52. Consequently, only a very weak signal is developed by the receiving antenna 18C, and the output from detector 211 is negligible.

As the initial portion of the identification member 14C moves through the scanning zone at the focus of lenses 51 and 52, a series of pulse signals are developed at the receiving antenna 18C. There are at least three such pulses, since, as noted above, each end of the identification member 14C is provided with at least three reflector dipoles such as the dipoles 120, 121 and 122 in FIG. 13. These initial pulse signals are detected by the circuit 211, amplified in the circuit 212, and again detected in the circuit 214, and applied to the clock pulse generator 215. These initial pulse signals are utilized to actuate the clock pulse generator and to time its operation; after the first series of received pulse signals, the clock pulse generator continues to produce pulses at a rate corresponding to the pulse rate for the initially received signals until it is shut off.

The clock pulse generator 215 produces an output pulse corresponding to each of the three received pulses. Each time this occurs, enabling signals are supplied from the clock pulse generator to the coincidence gate 216 and to the "one" gate 218. The output from the coincidence gate 216 actuates the "one" gate 218 and supplies a suitable recording signal to the storage register 219. At the same time, the output signal from the coincidence gate blocks operation of the gate 217, so that no "zero" signal is recorded. In each of these cycles, the register 219 is stepped along by the pulse signal from the clock generator 215, which may be delayed suitably to time the stepping operation after recording is completed.

When the first blank code position is scanned, on the identification member 14C, no appreciable pulse signal is developed in the receiving circuits 211, 212 and 214. Consequently, there is no output signal from peak detector 214 to the coincidence gate 216. In timed coincidence with this occurrence, however, a clock pulse is produced by generator 215. This signal is supplied to "zero" gate 217 and, since there is no inhibiting output signal from the coincidence gate 216, is transmitted from gate 217 to the storage register 219. The register is again stepped along by the clock pulse signal, continuing the recording operation. It is thus seen that the cross-gating system comprising gates 216, 217 and 218 provides for effective recording both of binary ones and binary zeros in the storage register 219 and reproduces the full code data from the member 14C.

When the identification member 14C has been completely scanned, the storage register 219 is filled. Completion of the recording operation can be utilized to shut off the clock pulse generator 215 and condition it for the next recording operation. Of course, it is necessary to read out the storage register 219 and restore it to cleared condition before the next identification member is scanned, but this is readily accomplished. The system operation is predicated on the assumption that the velocity of the identification member 14C does not change appreciably during the period in which it is scanned. However, this assumption is quite valid for normal vehicle movement.

In some environments, it may be desirable to provide for heating of the scanning station equipment to provide a relatively uniform temperature. This can be accomplished by a suitable chamber heater 221 located in a common enclosure with all of the circuit equipment shown in FIG. 12. In addition, resistance heaters 222 and 223 may be incorporated in the lens and grid structures to avoid frosting of the lenses, although this is not completely essential because the lenses can function even when occluded with considerable moisture.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. In an automatic object identification apparatus of the kind including a source of microwave signals of given frequency, a transmitting antenna for radiating said signal from a given point, an identification member mounted on an object to be identified in position to intercept and reflect the radiated signal as the object passes the transmitting antenna along a given path, and a receiving antenna located immediately adjacent said transmitting antenna, a lens system comprising:

a first microwave zone plate lens, comprising a first series of arcuate bands each having a given microwave transmission characteristic, radiating concentrically outwardly from an axis aligned with said transmitting antenna and interspersed in substantially coplanar relation with a second similar series of arcuate bands, having a substantially different microwave transmission characteristic, at said given frequency, said lens being interposed between said transmitting antenna and said path, for focussing said radiated microwave signal at a predetermined point on said path;

a second microwave zone plate lens, substantially similar in construction to said first lens, and disposed in coaxial relation thereto, for focussing signals reflected from said identification members back to said receiving antenna;

and a planar conductive septum, disposed along the common axis of said lenses, for precluding direct cross-talk between the transmitting antenna and the receiving antenna.

2. A lens system according to claim 1 in which each of said zone plate lenses comprises a dielectric sheet, said first series of bands being formed by thin conductive coatings on the surface of the dielectric sheet facing the transmitting antenna and the second series of bands constituting uncoated intermediate areas of said surface of the dielectric sheet.

3. A lens system according to claim 1 in which the bands of said zone plate lenses are of semi-circular configuration.

4. In an automatic object identification apparatus of the kind including a source of microwave signals of given frequency, a transmitting antenna for radiating said signal from a given point, an identification member mounted on an object to be identified in position to intercept and reflect the radiated signal as the object passes the transmitting antenna along a given path, and a receiving antenna located immediately adjacent said transmitting antenna, a lens system comprising:

a first microwave zone plate lens, comprising a sheet of dielectric material of predetermined dielectric constant at said given frequency and having a first series of bands of given thickness interspersed with a second series of bands having a substantially different thickness to afford differential delay characteristics for transmission of said radiated signals, at said given frequency, through said sheet, said lens being interposed between said transmitting antenna and said path, for focussing said radiated microwave signal at a predetermined point on said path;

a second microwave zone plate lens, substantially similar in construction to said first lens, and disposed in essentially coplanar adjoining relation with said first lens, for focussing signals reflected from said identification members back to said receiving antenna;

and a conductive planar septum extending from the juncture of said two lenses to a point intermediate said two antennas to preclude direct cross-talk from said transmitting antenna to said receiving antenna.

5. A lens system according to claim 4 in which the boundaries of said bands are determined approximately in accordance with the expression:

$$a_n^2 = \frac{(u)(v)+\alpha_n}{\left(\frac{u+v}{2}\right)^2+\alpha_n}\cdot\alpha_n$$

in which $$\alpha_n \equiv (u+v)\frac{n\lambda}{4}+\left(\frac{n\lambda}{4}\right)^2$$

and in which n=number of boundary outwardly of lens axis
u=distance from transmitter antenna to lens
v=distance from lens to identification member path
λ=wavelength of microwave signal
$a_n$=spacing of nth boundary from lens axis.

[and in which the differential thickness of the bands is determined by the expression:

$$t_1=\frac{\lambda}{2(\sqrt{K_\epsilon}-1)}$$

in which $t_1$=differential thickness
$k_\epsilon$=dielectric constant of the lens.]

6. An automatic vehicle identification apparatus comprising:

a source of microwave signals of given frequency;
transmitting antenna means for radiating said signal, from a given point, with two distinctive orthogonal polarization components;
an identification member mounted on a vehicle in position to intercept and reflect the radiated signal components, in a selective code pattern, as the vehicle passes the transmitting antenna along a given path;
a pair of receiving antennas located immediately adjacent said transmitting antenna, and arranged for reception of respective ones of said orthogonally polarized signal components;
a first microwave zone plate lens, comprising a first series of bands each having a given microwave transmission characteristic interspersed with a second series of bands having a substantially different microwave transmission characteristic, at said given frequency, interposed between said transmitting antenna and said path, for focussing said radiated microwave signal components at a predetermined point on said path; a second microwave zone plate lens, substantially similar in construction to said first lens and disposed in adjoining coplanar relation thereto, for focussing signals reflected from said identification members back to said receiving antennas;
and a conductive ground plane, extending from the juncture of said first and second lens, and separating said transmitting antenna means from said receiving antennas to preclude direct cross-talk therebetween.

7. In an automatic vehicle identification apparatus of the kind including a source of microwave signals of given frequency, a transmitting antenna for radiating said signal with a given initial polarization, an identification member mounted on a vehicle in position to intercept and reflect the radiated signal with a second polarization, as the vehicle moves along a given path past the transmitting antenna, and a receiving antenna located adjacent said transmitting antenna, a lens system comprising:

a first microwave zone plate lens, interposed between said transmitting antenna and said path, for focusing said radiated microwave signal at a predetermined point on said path;
a second microwave zone plate lens, interposed between said path and said receiving antenna, for focussing signals reflected from said identification members back to said receiving antenna;
and polarization grid means, interposed between said path and said receiving antenna, for limiting reflected signals focussed upon said receiving antenna to said second polarization.

8. A lens system according to claim 7 in which each zone plate lens comprises a first series of bands each having a given microwave transmission characteristic interspersed with a second series of bands having a substantially different microwave transmission characteristic, and in which the boundaries of said bands are determined approximately in accordance with the expression:

$$a_n^2=\frac{(u)(v)+\alpha_n}{\left(\frac{u+v}{2}\right)^2+\alpha_n}\cdot\alpha_n$$

in which $$\alpha_n=(u+v)\frac{n\lambda}{4}+\left(\frac{n\lambda}{4}\right)^2$$

and in which n=number of boundary outwardly of lens axis
u=distance from transmitter antenna to lens
v=distance from lens to identification member path
λ=wavelength of microwave signal
$a_n$=spacing of nth boundary from lens axis.

9. A lens system according to claim 8 in which said bands are of linear configuration oriented in a vertical direction and in which the parameter $a_n$ identifies the horizontal spacing of the band boundaries outwardly of the lens.

10. A lens system according to claim 8 in which the base of the lens is a dielectric sheet having a dielectric constant other than unity and in which the boundaries of said bands are each corrected by an increment determined in accordance with the expression:

$$\Delta a_n=t\sqrt{k_\epsilon}\left(\frac{1-\sqrt{1-\frac{\sin^2 B^2}{k_\epsilon}}}{\sin B_1+\sin B_2}\right)$$

in which $\Delta a_n$=correction increment away from lens axis
t=thickness of lens dielectric
$k_\epsilon$=dielectric constant of lens support, and in which $$\sin B_1=\frac{a_n}{\sqrt{u^2+a_n^2}}$$

$$\sin B_2=\frac{a_n}{\sqrt{v^2+a_n^2}}$$

11. In an automatic object identification apparatus of the kind including a source of radiant energy signals of given wavelength, a transmitting means for radiating said signal with a given initial polarization, an identification member mounted on an object to be identified in position to intercept and reflect the radiated signal with a displacement of 90° in polarization, as the object moves along a given path past the transmitting means and a receiving means located adjacent said transmitting means, a lens system comprising:

a first lens, interposed between said transmitting means and said path, for focusing said radiated signal at a predetermined point on said path;
a second lens, interposed between said path and said receiving means, for focusing signals reflected from said identification members to said receiving means;
first polarization grid means, interposed between said first lens and said path, for limiting the radiated signal to said initial polarization; and
second polarization grid means, interposed between said path and said receiving means, for limiting reflected signals impinging upon said receiving means to said second polarization.

12. A lens system according to claim 11 in which each grid means comprises alternate conductive and non-conductive bands extending transversely of the associated lens normal to the direction of polarization of signals to be passed by the grid means, the width of each band being substantially smaller than one-half wavelength at said given frequency.

13. In an automatic vehicle identification apparatus of the kind including a source of microwave signals of given frequency, a transmitting antenna for radiating said signal with a given initial polarization, an identification member mounted on a vehicle in position to intercept and reflect the radiated signal with a second polarization, as the vehicle moves along a given path past the transmitting antenna and a receiving antenna located adjacent said transmitting antenna, a lens system comprising:

a first microwave zone plate lens, comprising a first series of bands each having a given microwave transmission characteristic interspersed with a second series of bands having a substantially different microwave transmission characteristic, at said given frequency, interposed between said transmitting antenna and said path, for focussing said radiated microwave signal at a predetermined point on said path;

a second microwave zone plate lens, substantially similar in construction to said first lens, for focussing signals reflected from said identification members back to said receiving antenna;

first polarization-rejection grid means, interposed between said first lens and said path, for limiting the radiated signal to said initial polarization; and second polarization-rejection grid means, interposed between said path and said receiving antenna for limiting reflected signals impinging upon said receiving antenna to said second polarization, each of said grid means comprising a series of elongated conductive elements extending transversely of the associated lens parallel to the direction of polarization of signals to be rejected.

14. A lens system according to claim 13 in which said first series of bands in each lens is of conductive material and said second series of conductive bands is of dielectric material, and in which said conductive element of said grid means are essentially coplanar with said conductive bands.

15. In an automatic vehicle identification apparatus of the kind including a source of microwave signals of given frequency, a transmitting antenna for radiating said signal with a given initial polarization, an identification member mounted on a vehicle in position to intercept and reflect the radiated signal with a second polarization, as the vehicle moves along a given path past the transmitting antenna, and a receiving antenna located adjacent said transmitting antenna, a synchronized identity detection system comprising:

a plurality of identification members each comprising a series of equally spaced code positions, and each bearing a series of individual reflector elements disposed at predetermined ones of said code positions to identify a particular vehicle, a given number of end code positions in each identification member always including individual reflectors, but with a plurality of blank internal code positions in the series;

detector means, coupled to said receiving antenna, for developing primary pulse signals in response to reflected radiation signals from the reflector elements as an identification member traverses said path;

a clock pulse generator, coupled to said detector means and responsive to the pulse signals from said end code positions, for generating a series of clock pulses recurring at the same rate as the rate of movement of code positions of said identification member along said path;

and gating means, coupled to said detector and to said clock pulse generator, for reproducing the complete code identification of the vehicle, identifying both the blank code positions and the reflector code positions.

16. In an automatic vehicle identification apparatus of the kind including a source of microwave signals of given frequency, a transmitting antenna for radiating said signal with a given initial polarization, an identification member mounted on a vehicle in position to intercept and reflect the radiated signal with a second polarization, as the vehicle moves along a given path past the transmitting antenna and a receiving antenna located adjacent said transmitting antenna, a synchronized identity detection system comprising:

a plurality of identification members each subdivided into a series of equally spaced code positions, and each bearing a series of individual reflector elements disposed at predetermined ones of said code positions to identify a particular vehicle in accordance with a predetermined binary code, a given number of end code positions in each identification member always including individual reflectors but with a plurality of blank internal code positions in the series;

detector means, coupled to said receiving antenna, for developing primary pulse signals in response to reflected radiation signals from the reflector elements as an identification member traverses said path;

a clock pulse generator, coupled to said detector means and responsive to the pulse signals from said end code positions for generating a series of clock pulses recurring at the same rate as the rate of movement of code positions of said identification member along said path;

a storage register;

and gating means coupling said detector and said clock pulse generator to said storage register to record the complete binary code identification of the vehicle, including both the blank code positions and the reflector code positions, in said register.

17. In an automatic vehicle identification apparatus of the kind including a source of microwave signals of given frequency, a transmitting antenna for radiating said signal with a given initial polarization, an identification member mounted on a vehicle in position to intercept and reflect the radiated signal with a second polarization, as the vehicle moves along a given path past the transmitting antenna and a receiving antenna located adjacent said transmitting antenna, a synchronized identity detection system comprising:

a plurality of identification members each subdivided into a series of equally spaced code positions, and each bearing a series of individual reflector elements disposed at predetermined ones of said code positions to identify a particular vehicle in accordance with a predetermined binary code in which the presence of a reflector represents a binary "one" and a blank code position represents a binary "zero," a given number of end code positions in each identification member always including individual reflectors but with at least some blank internal code positions in the series;

detector means coupled to said receiving antenna, for developing primary pulse signals in response to reflected radiation signals from said reflector elements on an identification member traversing said path;

a clock pulse generator, coupled to said detector means and responsive to the pulse signals from said end code positions, for generating a series of clock pulses recurring at the same rate as the rate of movement of code positions of said identification member along said path;

a storage register;

and gating means coupling said detector and said clock pulse generator to said storage register to record in said register the complete code identification of the vehicle, identifying both the blank code positions and the reflector code positions, said gating means comprising a coincidence gate actuated jointly by a clock pulse and a "one" pulse from said detector, a "one" AND gate enabled by signals from the clock pulse generator and the coincidence gate, and a "zero" X BUT NOT Y gate enabled by signals from the clock pulse generator and inhibited by signals from the coincidence gate.

18. An automatic object identification apparatus comprising:

a transmitting means for radiating radiant energy signals of given wavelength from a given point and with a given initial polarization;

a series of identification members each mounted upon a respective object to be identified in position to intercept and reflect the radiated signal, with a change to a second polarization, as the object passes the transmitting means along a given path;

a receiving means located immediately adjacent said transmitting means;

a first lens, comprising a first series of bands each having a given transmission characteristic for radiant energy at said given wavelength, interspersed with a second series of bands having a substantially different transmission characteristic at said given wavelength, interposed between said transmitting means and said path, for focussing said radiated signal at a predetermined point on said path traversed by said identification member;

a second lens, similar in construction to said first lens, interposed between said path and said receiving means, for focussing signals reflected from said identification members back to said receiving means; and polarization-sensitive filtering means, interposed between said path and said receiving means, for limiting reflected signals focussed upon said receiving means to said second polarization.

19. An automatic object identification apparatus comprising:

a transmitting means for radiating radiant energy signals of given wavelength from a given point with two distinctively different polarization components;

a series of identification members each mounted upon a respective object to be identified in position to intercept and reflect the radiated signal in a selective code pattern and with a substantial change of polarization as the object passes the transmitting means along a given path;

a pair of receiving means both located immediately adjacent said transmitting means;

a first lens, comprising a first series of bands each having a given transmission characteristic for radiant energy at said given wavelength, interspersed with a second series of bands having a substantially different transmission characteristic at said given wavelength, interposed between said transmitting means and said path, for focussing said radiated signal at a predetermined point on said path traversed by said identification members;

a second lens, similar in construction to said first lens, interposed between said path and said pair of receiving means in coaxial relation to said first lens, for focussing signals reflected from said identification members back to said receiving means; and a planar conductive septum, disposed along the common axis of said lenses, for precluding direct crosstalk between the transmitting antenna and the receiving antenna.

20. In an automatic object identification apparatus of the kind including a transmitting means for radiating a radiant energy signal of given wavelength and of given initial polarization from a given point, an identification member mounted upon an object to be identified in position to intercept and reflect the radiated signal as the object passes the transmitting means along a given path, and a receiving means located immediately adjacent said transmitting means, and in which the reflected signal is changed to a second polarization different from said initial polarization, a lens system comprising:

a first zone plate lens, interposed between said transmitting means and said path, for focussing said radiated signal at a predetermined focal point on said path traversed by said identification member;

a second zone plate lens, interposed between said path and said receiving means, for focussing signals reflected from said identification member back to said receiving means;

and polarization grid means, interposed between said path and said receiving means, for limiting reflected signals reaching said receiving means to said second polarization.

References Cited

The following references, cited by the Examiner, are of record in the patented file of this patent or the original patent.

UNITED STATES PATENTS

| | | | |
|---|---|---|---|
| 2,043,347 | 6/1936 | Clavier et al. | 343—755 |
| 2,582,728 | 1/1952 | Walker | 343—5 |
| 2,845,622 | 7/1958 | Gamble | 343—16 |
| 2,999,152 | 9/1961 | Gallagher et al. | 340—146.3 X |
| 3,090,952 | 5/1963 | Kuck | 343—7.4 |

RODNEY D. BENNETT, *Primary Examiner.*

D. C. KAUFMAN, *Assistant Examiner.*